B. H. Haverly
INVENTOR

Patented Apr. 7, 1953

2,634,179

UNITED STATES PATENT OFFICE 2,634,179

PISTON RING

Byron H. Haverly, North Blenheim, N. Y.

Application September 28, 1949, Serial No. 118,423

1 Claim. (Cl. 309—7)

This invention relates to piston ring construction, and more particularly to piston rings which are used at the upper ends of pistons, the piston ring being so constructed that oil will be permitted to pass to the upper end of the cylinder, lubricating the wall of the cylinder which in known engine construction does not receive proper lubrication resulting in excessive wear at the upper end of the cylinder.

A further object of the invention is to provide a piston ring which will be forced against the cylinder wall by compression, during the compression stroke of the piston, the construction of the piston ring eliminating excessive pressure thereby providing means for controlling the pressure to any desired amount, and consequently reducing wear to a minimum.

Still another object of the invention is to provide a piston ring which will return surplus oil from the cylinder wall to the crank case through the piston, the oil acting to absorb engine heat, thereby increasing the efficiency of the engine.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing.

Figure 1:
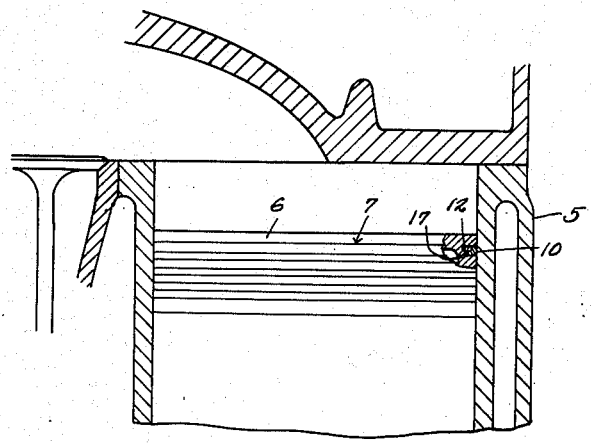
Figure 1 is a fragmental sectional view through a cylinder illustrating a piston operating therein and provided with a ring constructed in accordance with the invention.

Referring to the drawing in detail, the reference character 5 indicates a cylinder wall of an internal combustion engine, in which the piston 6 operates, the piston being provided with a ring groove indicated by the reference character 7.

The ring groove forms an important feature of the present invention, since it has been constructed to receive the piston ring or packing which constitutes the subject matter of the present invention, and which has been constructed in a particular manner for accomplishing a particular result.

As shown, the ring groove is formed with an upper offset portion 8 providing an annular shoulder 9.

Figure 3:
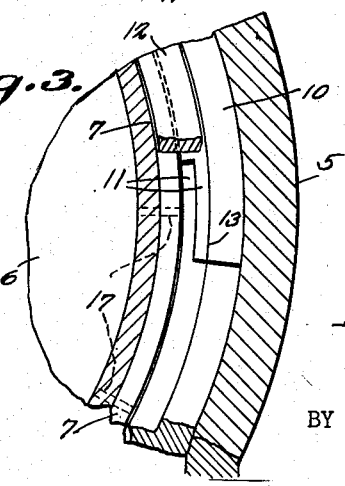
Fig. 3 is a fragmental plan view illustrating the stepped construction at the split ends of the piston rings.

The piston ring is indicated generally by the reference character 10 and is provided with overlapping ends 11, overlapped in stepped formation, as clearly shown by Fig. 3 of the drawing, thereby to eliminate loss of compression at the connected ends of the split ring.

Figure 2:
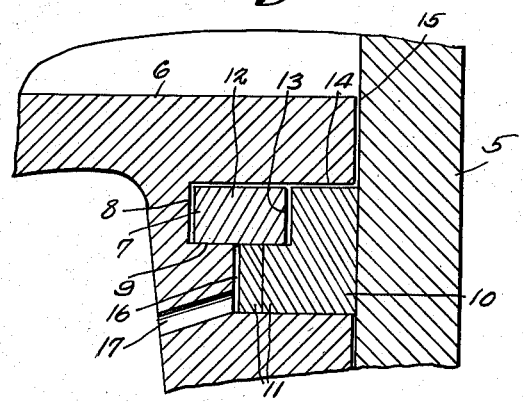
Fig. 2 is an enlarged fragmental sectional view showing the ring as positioned in a ring groove of a piston.

As shown by Fig. 2 of the drawing, the piston ring 10 is formed with an annular cut away portion extending inwardly from the inner surface of the piston ring at a point intermediate the height of the ring, the cut away portion extending through substantially one-half of the width of the ring proper.

This cut away portion is of a depth to accommodate the split sealing ring 12, which is formed slightly smaller than the space provided between the wall 13 of the ring proper, and inner wall of the upper offset portion of the ring groove indicated at 8. This sealing ring overlies the space between the inner edge of the ring groove, and inner edge of the piston ring to the end that the piston ring will not be subjected to the pressure ordinarily directed thereto by the compression stroke of the piston, wherein the compression finds its way between the inner edge of the piston ring and inner wall of the ring groove. As shown by Fig. 2 of the drawing, the sealing ring 12 is spaced from the wall 13 of the piston ring, the space communicating with the space 14 formed between the upper surface of the piston ring and top of the ring groove, the space 14 communicating with the annular space or passageway 15 between the piston and cylinder wall so that compression may find its way through the space 15 and expand within the space between the wall 13 and sealing ring 12, forcing the piston ring 10 outwardly against the wall of the cylinder to provide a compression type connection at this point. Due to the sealing ring, it will be obvious that the space 16 between the piston ring and inner wall of the ring groove, will be sealed off, thereby reducing the pressure directed to the piston ring, to insure against the ring causing undue wear on the cylinder wall.

This piston is provided with a plurality of bores 17 which are inclined downwardly towards the center of the piston, the bores 17 providing passageways for oil to pass from the upper portion of the ring, to the interior of the piston, and to the crank case, eliminating surplus oil which would otherwise foul the spark plugs of the engine.

In operation, assuming that piston 6 is moving up, in the cylinder, the ring would be resting on the lower side of the ring groove and the sealing ring would be resting on the shoulder of the piston groove and piston ring as in the drawing. When the piston moves upwardly in the cylinder, the upper corner of the ring 10 in contact with the cylinder wall scrapes the oil film from the cylinder wall. A portion of this oil is forced into the space 14 between the rings and ring groove. When the motion of the piston is reversed and the piston starts down the rings, due to friction on the cylinder wall, will move up against the top of the ring groove and by so doing, compress this oil forcing it back into the groove 8 and as the sealing ring by moving upwardly lifts from its seat on the shoulder 9, the oil is caused to be drawn into the space 16 and through bore 17 to the inside of the piston.

Assuming that the piston is moving downwardly in the cylinder, the rings are up against the top ring groove leaving a space between the lower side of the piston ring and the lower ring groove. When the piston moves downwardly in the cylinder, the lower corner of the piston ring in contact with the cylinder, scrapes oil film from the cylinder and a portion of this oil is forced between the lower side of the ring and the ring groove, and when the piston motion reverses, this oil will be forced in space 16 and will drain through the bore 17.

Having thus described the invention, what is claimed is:

A piston ring for positioning in a main ring groove of a piston, the ring groove having an annular inwardly extended offset portion providing an upper ring groove communicating with the main ring groove, a main ring member having its inner upper edge cut away, fitted within the main ring groove, the cut-away portion of said main ring providing a shoulder aligning with the offset portion of the piston ring groove, providing a sealing ring groove, a sealing ring fitted within the offset portion of the ring groove, resting on the shoulder of said main ring, the front and rear edges of the sealing ring being spaced from the main ring and inner wall of the offset portion of the ring groove respectively, providing compression spaces between the sealing ring and main ring, and said piston having drain bores downwardly inclined from the ring groove, through which surplus oil is directed to the interior of the piston.

BYRON H. HAVERLY.

REFERENCES CITED

The following references are of record in the file of this patent:

UNITED STATES PATENTS

| Number | Name | Date |
|---|---|---|
| 2,260,031 | Johnston | Oct. 21, 1941 |
| 2,415,594 | Jessup | Feb. 11, 1947 |

FOREIGN PATENTS

| Number | Country | Date |
|---|---|---|
| 302,741 | Great Britain | Dec. 27, 1928 |
| 498,123 | Great Britain | Jan. 3, 1938 |
| 703,467 | Germany | of 1941 |